(12) United States Patent
Sato et al.

(10) Patent No.: US 6,209,046 B1
(45) Date of Patent: Mar. 27, 2001

(54) DMA TRANSFER FROM A STORAGE UNIT TO A HOST USING AT LEAST TWO TRANSFER RATES AND CYCLIC ERROR DETECTION

(75) Inventors: Masahiko Sato, Yokohama; Toshio Kakihara, Fujisawa; Atsushi Kanamaru, Sagamihara; Hiroshi Oshikawa, Fujisawa; Hideo Asano, Machida, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/121,944

(22) Filed: Jul. 24, 1998

(30) Foreign Application Priority Data

Jul. 24, 1997 (JP) .................................................. 9-198728

(51) Int. Cl.⁷ ...................................................... G06F 13/38
(52) U.S. Cl. ................................. 710/22; 710/60; 714/708
(58) Field of Search ......................... 710/22, 60; 714/708

(56) References Cited

U.S. PATENT DOCUMENTS

| 4,153,916 | * | 5/1979 | Miwa et al. | ........................... 358/406 |
| 5,826,106 | * | 10/1998 | Pang | ....................................... 710/25 |
| 6,035,425 | * | 3/2000 | Caldwell et al. | ....................... 714/52 |

* cited by examiner

Primary Examiner—Kenneth S. Kim
(74) Attorney, Agent, or Firm—G. Marlin Knight (57) ABSTRACT

Methods and apparatus are described for a data transfer unit between a storage unit and a host, wherein a slower data transfer rate is established when a predetermined error is detected. In one embodiment the cyclicity of the error occurrence calculated and a wait is inserted between data to avoid transferring data at the calculated cyclicity point of the detected error. Optionally the data transfer unit may return the data transfer rate to the original data transfer rate or state after a predetermined time has elapsed, after a predetermined number of commands have been received, after a predetermined amount of data have been transferred, or by combination of these.

6 Claims, 5 Drawing Sheets

DMA TRANSFER FROM A STORAGE UNIT TO A HOST USING AT LEAST TWO TRANSFER RATES AND CYCLIC ERROR DETECTION

BACKGROUND OF THE INVENTION

1. Field of the Invention

The present invention relates to a data transfer unit, a disk unit, and a data transfer method which are employed in hard disk drives (HDDs), and more particularly to a data transfer unit, a disk unit, and a data transfer method equipped with a data transfer function.

2. Description of Related Art

Ultra ATA is an interface standard for enhanced integrated device electronics (EIDE) that has been standardized as the next version of the Fast ATA-3 version to realize fast transfer rate.

The Ultra ATA supports an ultra direct memory access (DMA)/33 transfer protocol and the maximum data transfer rate is 33M bytes/sec. The data transfer by a DMA mode makes it possible to transfer data directly between main memory and peripheral equipment, such as HDDS, without having recourse to intervention of a central processing unit (CPU). The present ultra DMA/33 prescribes three modes: transfer mode 0 through mode 2, depending upon transfer rates.

The data transfer rate of the Ultra DMA transfer mode is double that of the Multi-word DMA transfer mode of the Fast ATA-3, as shown in Table 1.

TABLE 1

|  | Ultra DMA Transfer | Multi-word DMA Transfer |
| --- | --- | --- |
| Mode 0 | 16.6 MB/s (120 ns) | 8.3 MB/s (240 ns) |
| Mode 1 | 22.2 MB/s (90 ns) | 11.1 MB/s (180 ns) |
| Mode 2 | 33.3 MB/s (60 ns) | 16.6 MB/s (240 ns) |

Also, in the Ultra ATA, a data sending side (for example, a hard disk drive during a read operation and a host during a write operation) drives a strobe signal which determines the timing at which data is fetched, thereby controlling data transfer rate at the data sending side. In fact, the data transfer rate at the hard disk drive is set by a Set Features command (EFh) from the host, and the data transfer rate will be reset if the hard disk drive receives a power-on reset or hard reset signal from the host.

Thus, in the Ultra DMA transfer protocol, since the data transfer rate is increased twice, there is a need to detect an error in the data transferred onto the IDE I/F bus, and there is added a cyclic redundancy check (CRC) function which calculates the CRC value of transferred data at the host and the hard disk drive and compares the calculated CRC value.

Where an error is detected by the aforementioned CRC function, the host merely reissues the command to the disk drive. However, in the case where temporarily the signal quality on the IDE I/F bus becomes degraded and a CRC error frequently occurs, the number of command reissue is increased, and consequently, an extreme reduction in the throughput of data transfer takes place. Furthermore, when a CRC error cannot be recovered by command reissue alone, the entire system will be stopped.

Accordingly, it is an object of the present invention to provide a data transfer unit, a disk drive, and a data transfer method which are capable of decreasing the cases in an Ultra DMA transfer mode of extreme reductions in the throughput of data caused by the command reissue and a final system stop. An example would be a temporary CRC error frequently occurring during the data transfer on Read DMA Commands which can be fixed by only a change on the disk drive side without requiring any changes of the existing mechanism on the host side. It is an object of the invention to realize highly reliable data transfer and a minimum reduction in the throughput of data transfer.

Another object of the present invention is to provide similar improvements in an Ultra DMA transfer mode for problems caused by command reissue and a final system stop.

Still another object of the present invention is to provide a solution which is capable of transferring data without errors in an Ultra DMA transfer mode.

SUMMARY OF THE INVENTION

In accordance with the present invention, there is provided a data transfer unit for transferring data in a direct memory access (DMA) transfer mode between a storage unit and a host, wherein a slower data transfer rate is established when a predetermined error is detected. In one embodiment the cyclicity of the error occurrence calculated and a wait is inserted between data to avoid the calculated cyclicity of the detected error. Optionally the data transfer unit may return the data transfer rate to the original data transfer rate, state or a default state after a predetermined time has elapsed, after a predetermined number of commands have been received, after a predetermined amount of data have been transferred, or by combination of these.

The aforementioned DMA transfer mode may also be based upon an Ultra DMA transfer mode.

In accordance with the present invention, there is provided a method of transferring data to and from a storage unit and a host, comprising the steps of: setting a first data transfer rate; transferring data between the storage unit and the host at the first data transfer rate; detecting an error in the transferred data; setting the data transfer rate to a second data transfer rate slower than the first data transfer rate when a predetermined error is detected; and transferring data at the second transfer rate.

DETAILED DESCRIPTION OF THE PREFERRED EMBODIMENT

A disk drive according to the present invention can be applied to a small HDD equipped with an integrated device electronics (IDE) interface.

First Embodiment

Figure 1:
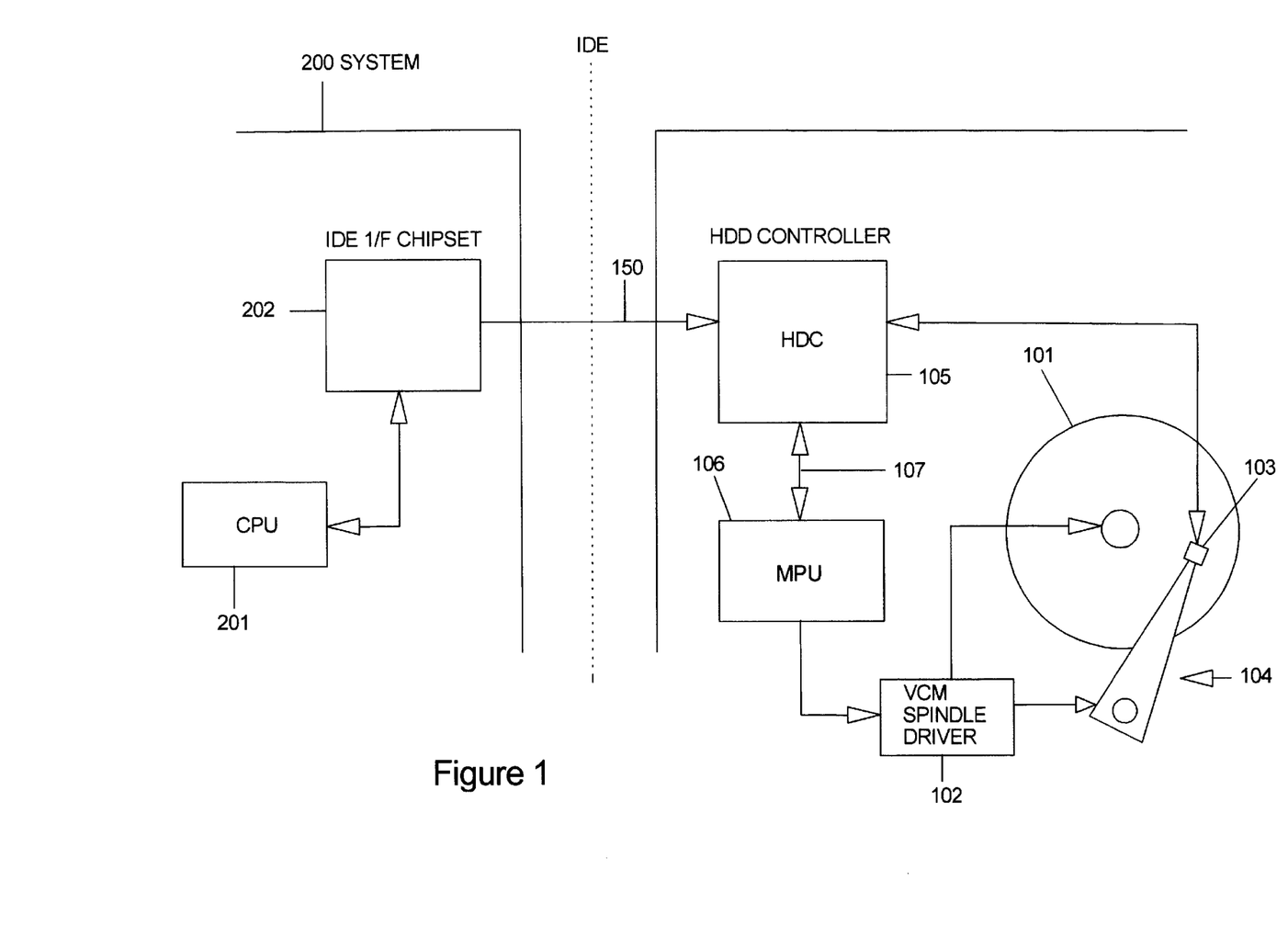
FIG. 1 is a block diagram showing the constitution of a disk drive according to a first embodiment to which the present invention is applied.

FIG. 1 is a block diagram showing the constitution of a disk drive according to a first embodiment of the present invention.

In FIG. 1 reference numeral 100 denotes a magnetic disk drive (HDD) and 200 a personal computer (PC) as a host. The magnetic disk drive (HDD) 100 is connected to the PC 200, for example, by an IDE interface.

The magnetic disk drive (HDD) 100 is constituted by a magnetic disk 101 which is a data recording medium, a VCM spindle driver 102 including a spindle motor for driving the magnetic disk 101 to rotate, a magnetic head 103 for performing reading and writing of data on the magnetic disk 101, an actuator mechanism 104 for moving over the surface of the magnetic disk 101 or to an evacuating position a head slider having the magnetic head 103, a hard disk controller (HDC) 105 for controlling an operation of reading or writing data from or to the magnetic disk 101, and a microprocessor unit (MPU) 106 for controlling the entire operation of the HDD 100, including the control of the HDC 105.

The HDC 105 is connected to the MPU 106 by a control bus 107 and is connected to an external host of the HDD by an IDE I/F bus 150. The HDC 105 has internal memory which can store all data needed for data transfer, and is capable of performing data transfer in DMA mode in which data is transferred directly to a host without intervention of the MPU 106.

The MPU 106 is a microprocessor which executes a control program, and the MPU 106 is equipped with memory which stores the control program and data. The MPU 106 operates in accordance with the control program and controls the entire operation of the HDD 100. Also, based on the command and control data which are supplied from the HDC 105 and a host, the MPU 106 controls the operation of the HDC 105.

On the other hand, the PC 200, which becomes the host, has a CPU 201 and also has, for example, an IDE I/F chipset 202. The IDE I/F chipset 202 is made by forming an IDE interface into one chip. The PC 200 performs data transfer between it and the HDD 100 in Ultra ATA which is an interface standard for enhanced integrated device electronics (EIDE). The Ultra ATA standard maintains lower compatibility and supports the data transfer based on the Fast ATA.

Thus, the HDD 100 has the IDE interface, and the MPU 106 is equipped with data transfer means which transfers data at a predetermined data transfer rate from among a plurality of data transfer rates in accordance with a command from the host, error detection means which detects an error in transferred data, and control means which performs control so that data is transferred at a slower data transfer rate than the data transfer rate set according to a command from a host, if a predetermined error is detected by the error detection means.

The operation of the HDD 100 constructed as described above will hereinafter be described. Initially, a description will be made of the basic concepts of the present invention.

The data transfer rate during an Ultra DMA transfer mode can be controlled by a data sending side (for example, an HDD during a read operation and a host during a write operation).

Hence, in the present invention, when a CRC error occurs in a Read DMA Command in an Ultra DMA transfer mode, the data transfer rate corresponding to the Read DMA Command thereafter is automatically slowed by the disk drive side.

More specifically, during data transfer between the system (host) and the HDD, the calculated CRC value and the CRC value of the transferred data are compared with each other at the HDD side. In the conventional example, when a CRC error occurs, the HDD sends an error message to the system side. The system side resends the HDD the same command at the same transfer rate, and the HDD repeats the same operation again.

On the other hand, in the present invention, attention is paid to the fact that in an Ultra DMA transfer mode the data transfer rate can be controlled by a data sending side (during a read operation, data is transferred from the HDD to the system (host)), and if a CRC error is detected at the HDD side, then the HDD will slow the data transfer rate of the Read DMA Command thereafter and transfer data at the slower data transfer rate. Since slow data in data transfer rate always has to be accepted according to the protocol, the data can be accepted without performing any other change in the standard system.

In this way, frequent occurrences of a CRC error during a read operation can be prevented and therefore the number of reissue of a command at the time of error can be reduced. Furthermore, since data transfer rate can be automatically returned to the initial data transfer rate at certain timing, data transfer is performed with high reliability in correspondence with the condition of data on the IDE I/F bus, and a reduction in the throughput of data transfer can be suppressed to the minimum.

When the normal mode has been switched to a CRC error monitor mode, the timing at which data transfer rate is returned to the initial data transfer rate can be:

(1) after a certain time has elapsed, (2) after a certain number of commands have been received, (3) after a certain quantity of data has been transferred, or (4) combination of the above.

Furthermore, this timing is achievable by a change in the disk drive side without requiring any change in the existing host side.

The operation of the HDD 100 will now be described in detail based on the aforementioned basic concepts. The HDD 100 in the Ultra DMA transfer mode, when a CRC error occurs during the data transfer of a Read DMA Command (C8h: with retries, C9h: without retries) issued from the host 200, sends a CRC error message to the host 200 and, at the same time, sets the Ultra DMA transfer mode thereof to a transfer mode slower by one level than the current mode of the HDD 100 internally. At this time, the mode is switched to a CRC error monitor mode.

In the case where a CRC error occurs even in a command reissued from the host 200, the HDD 100 resets the current mode to a transfer mode further slower by one level. This processing is continued in the interior of the HDD until a CRC error will no longer occur or the current transfer mode reaches the transfer mode 0. In the case where the current Ultra DMA transfer mode is the transfer mode 0 (see Table 1), no mode change is performed.

When the Ultra DMA transfer mode is changed, the current mode is reset to the initial mode at certain timing, and it is monitored whether or not a CRC error occurs in a Read DMA Command thereafter. If no CRC error occurs, then the CRC error monitor mode is switched to the normal mode. Thereafter, data transfer is performed in the Initial Ultra DMA transfer mode. If a CRC error occurs, then the mode is slowed by one level at a time in the same way as the aforementioned. The timing at which data transfer rate is returned to the initial data transfer rate can be determined as described above.

Figure 2:
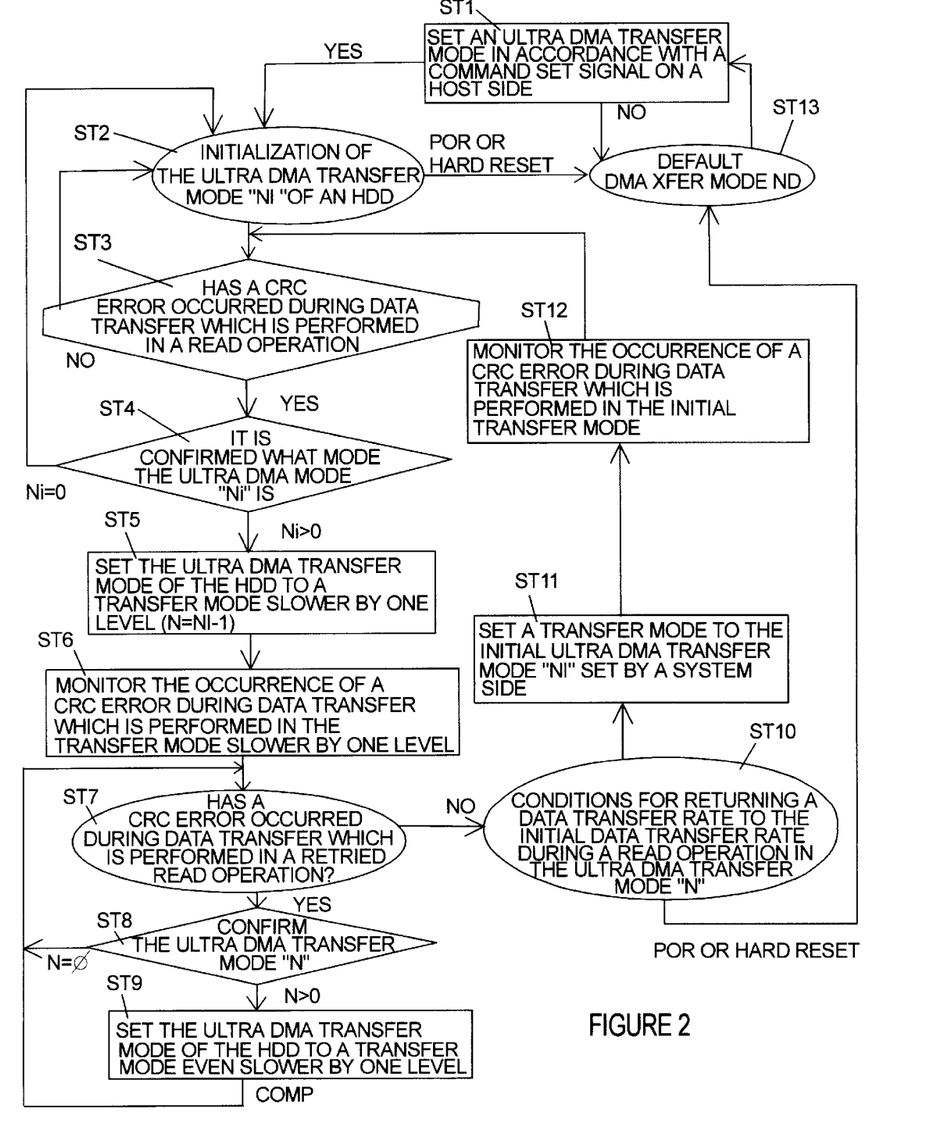
FIG. 2 is a flowchart showing the data transfer rate control that is performed by the aforementioned disk drive.

FIG. 2 is a flowchart showing the data transfer rate control that is performed by the HDD 100. This program is executed at a predetermined timing by the MPU 106. In the figure, reference character ST indicates step in the flow of operation and a part enclosed by an ellipse represents the status of each DMA transfer mode.

First, in step ST1 the data transfer mode (Ultra DMA transfer mode) of the HDD 100 is set according to the command set on the host side. When the HDD 100 can perform the operation of the Ultra DMA transfer mode, the data transfer mode shifts to the Ultra DMA transfer mode in step ST2 and steps thereafter. When the HDD 100 cannot perform the operation of the Ultra DMA transfer mode, in step ST13 the data transfer mode is set to a Default DMA transfer mode Nd which is default. More specifically, it has been determined that in an initial state, such as a state immediately after power is turned on, the HDD 100 equipped with the Ultra DMA transfer mode is in a Multi-word DMA transfer mode which is the default. The HDD 100 responds to the request of the Ultra DMA transfer mode from the host 200. Then, the host 200 receives the response from the HDD 100 and sends an Ultra DMA transfer command. Next, the HDD 100 receives the command, whereby the data transfer mode of the HDD 100 can shift to the Ultra DMA transfer mode.

In step ST2, the initialization of the Ultra DMA transfer mode of the HDD 100 is performed (Initial ultra DMA transfer mode Ni). When there is a power-on reset (POR) or hard reset signal, the data transfer mode is returned to the Default DMA transfer mode Nd of step ST13 which is the default.

Next, in step ST3 it is judged whether or not a CRC error has occurred during data transfer in a read operation. If a CRC error has not occurred during data transfer, then step ST3 will return to step ST2. In step ST2, data transfer is continued at the initial data transfer rate.

When a CRC error has occurred during data transfer, a process of slowing a transfer mode by one level at a time is performed in step ST4 and steps thereafter. More specifically, in step ST4 it is confirmed what mode the current Ultra DMA transfer mode is (i.e., it is confirmed what mode the Ultra DMA transfer mode Ni is). When the transfer mode Ni is 0, the data transfer mode is the slowest rate, Mode 0, among the Ultra DMA transfer modes (see Table 1). Therefore, it is judged that the data transfer mode can not be set to a slower transfer mode than this, and step ST4 returns to step ST2.

When the transfer mode Ni is greater than 0 (Ni>0), step ST4 advances to step ST5. In step ST5, the Ultra DMA transfer mode Ni of the HDD 100 is set to a transfer mode slower by one level (i.e., Ni=Ni−1) and a read operation is performed in the slower transfer mode.

Next, in step ST6 the occurrence of a CRC error during data transfer is monitored in the transfer mode slower by one level. In step ST7 it is judged whether or not a CRC error has occurred during the data transfer in the retried read operation.

If no CRC error occurs in the retried data transfer, then step ST7 advances to step ST10 and steps thereafter, in which a process of returning a data transfer rate to the initial data transfer rate is performed. When a CRC error has occurred in the retried data transfer, in step ST8 it is confirmed what mode the current Ultra DMA transfer mode N is. When the mode N is 0, it is judged that the current transfer mode N cannot be set to a transfer mode slower than this, because the current transfer mode is the slowest transfer mode 0 among the Ultra DMA transfer modes, and step ST8 returns to step ST7. When the mode N is greater than 0 (N>0), step ST8 advances to step ST9. In step ST9, the Ultra DMA transfer mode of the HDD 100 is set to a transfer mode even slower by one level (i.e., N=N−1) and a read operation is performed. Thereafter, step ST9 returns to step ST7.

By the processing in the aforementioned steps ST2 through ST9, in the Ultra DMA transfer modes, if a CRC error occurs during the data transfer of a Read DMA Command, then a data transfer mode is set to a transfer mode which is slower by one level and in which there is less occurrence of an error, and data transfer is retried by reissue of a command. When a CRC error occurs even in a transfer mode slower by one level, data transfer is retried in a transfer mode even slower by one level. This minimizes the number of CRC errors during data transfer, whereby reliable data transfer can be performed.

In this embodiment of the present invention, when a CRC error occurs, a data transfer mode has been slowed by one level at a time so that the number of CRC errors is reduced without lowering the data transfer rate, if possible. However, depending upon the status of the CRC error occurrence, a data transfer mode may also be set immediately to the slowest mode 0 among the Ultra DMA transfer modes.

Returning to the flowchart in FIG. 2, when a CRC error has no longer occurred at a certain data transfer rate in the aforementioned step ST7, in step ST10 a read operation is performed at that Ultra DMA transfer mode N. At the same time, the data transfer is judged to be in a state where there is no occurrence of a CRC error, and in step ST11 a process of returning data transfer rate to the original data transfer rate set by the system 200 is performed. The timing at which data transfer rate is returned to the initial data transfer rate is determined, for example, by (1) after a certain time has elapsed, (2) after a certain number of commands have been received, (3) after a certain quantity of data has been transferred, or (4) combination of them. In the data transfer state of step ST10 where there is no occurrence of a CRC error, when there is a POR or hard reset signal, the data transfer mode is returned to the Default DMA transfer mode Nd of step ST13.

In step ST12 the occurrence of a CRC error during data transfer is monitored in the transfer mode returned to the initial data transfer mode, and step ST12 returns to the aforementioned step ST3.

On the other hand, when in the initial state immediately after power is turned on, when the Ultra DMA transfer mode is not allowed by the host 200, or when there is a POR or hard reset signal in each state, in step ST13 the data transfer mode is set to the Default DMA transfer mode Nd which is default.

As described above, the HDD 100 and the host 200 according to the first embodiment are connected with the IDE interface. If even faster Ultra DMA/44 and Ultra DMA/66 data transfer are performed in future, the advantages of the present invention will be even greater.

In the first embodiment, since there is no change of the mechanism on the host side, an enhancement in the throughput of the entire system and an enhancement in the system reliability are achievable without any change in the existing system using the invention. These benefits are realizable by a change in the program of the MPU 106 without requiring any addition and change of hardware structure on the HDD side.

When the present invention is applied to the case of a write operation in which a Write DMA Command is issued from the host to the HDD, a partial change in the functioning on the host side becomes necessary. The data transfer rate control during a write operation will hereinafter be described by a second embodiment.

Second Embodiment

The entire structure of a disk drive according to a second embodiment of the present invention is similar to FIG. 1 and therefore a description of the hardware structure is omitted. However, in the second embodiment, the CPU 201 shown in FIG. 1 is constructed so as to execute the data transfer rate control of FIG. 3 to be described later which is similar to that described in FIG. 2.

If a CRC error occurs during the data transfer of the Write DMA Command (CAh: with retries, CBh: without retries) issued from the host to the HDD set in the Ultra DMA transfer mode or the Read DMA Command (C8h: with retries, C9h: without retries) and if the HDD sends a CRC error message to the host, the host will set the Ultra DMA transfer mode thereof and the Ultra DMA transfer mode of the HDD to a transfer mode slower by one level than the current mode, and the host will reissue the same command.

In the case where a CRC error has occurred even in the reissued command, the host resets the data transfer mode thereof and the data transfer mode of the HDD to a transfer mode further slower by one level and then reissues the same command. This processing is continued until a CRC error will no longer occur or the transfer mode reaches the transfer mode 0.

In the case where the current Ultra DMA transfer mode is a transfer mode 0, no mode change is performed, and the host will reissue the same command. When the Ultra DMA transfer mode is changed, thereafter the data transfer mode is reset to the initial transfer mode at certain timing, and it is monitored whether or not a CRC error occurs. If no CRC error occurs, the data transfer thereafter will be performed in the initial transfer mode. If a CRC error occurs, then the transfer mode will be slowed by one level at a time in the same way as the aforementioned.

The timing at which data transfer rate is returned to the initial data transfer rate can be determined by:

(1) after a certain time has elapsed,
(2) after a certain number of commands have been executed,
(3) after a certain quantity of data have been transferred, or
(4) combination of them, since the transfer mode has been changed.

Figure 3:
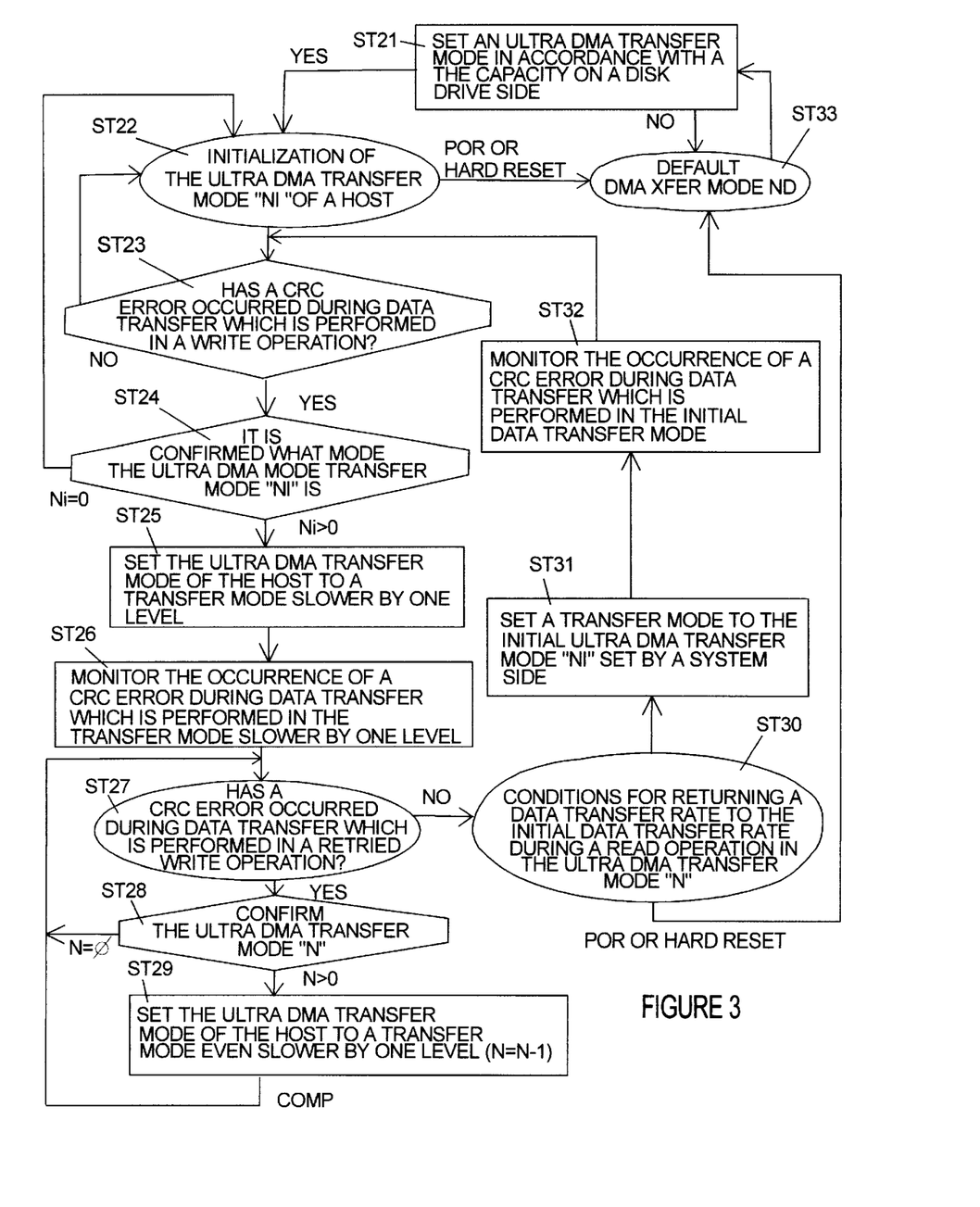
FIG. 3 is a flowchart showing the data transfer rate control that is performed at the side of a system which is the host of a disk drive according to a second embodiment to which the present invention is applied.

FIG. 3 is a flowchart showing the data transfer rate control that is performed on the side of a system which is a host. This program is executed at a predetermined timing by the CPU 201 of the PC 200. In the figure, a part enclosed by an ellipse indicates the state of each DMA transfer mode.

First, in step ST21 the data transfer mode (Ultra DMA transfer mode) is set according to the capacity of the HDD 100. When the HDD 100 can perform the operation of the Ultra DMA transfer mode, the data transfer mode shifts to the Ultra DMA transfer mode in step ST22 and steps thereafter. When the HDD 100 cannot perform the operation of the Ultra DMA transfer mode, in step ST33 the data transfer mode is set to a Default DMA transfer mode Nd which is default. More specifically, it has been determined that in an initial state, such as a state immediately after power is turned on, the HDD 100 equipped with the Ultra DMA transfer mode is in a Multi-word DMA transfer mode which is default. The HDD 100 responds to the request of the Ultra DMA transfer mode from the host 200. Then, the host 200 receives the response from the HDD 100 and sends an ultra DMA transfer command. Next, the HDD 100 receives the command, whereby the data transfer mode can shift to the Ultra DMA transfer mode. Also, in the system side (host side), the Ultra DMA transfer mode or the Multi-word DMA transfer mode can be arbitrarily set.

In step ST22, the initialization of the Ultra DMA transfer mode of the host 200 is performed (Initial Ultra DMA transfer mode Ni). When there is a power-on reset (POR) or hard reset signal, the data transfer mode is returned to the Default DMA transfer mode Nd of step ST33 which is default.

Next, in step ST23 it is judged whether or not a CRC error has occurred during data transfer in a write operation. If a CRC error has not occurred during data transfer, then step ST23 will return to step ST22. In step ST22, data transfer is continued at the initialized data transfer rate.

When a CRC error has occurred during data transfer, a process of slowing a transfer mode by one level at a time is performed in step ST24 and steps thereafter. More specifically, in step ST24 it is confirmed what mode the current Ultra DMA transfer mode is (i.e., it is confirmed what the Ultra DMA transfer mode Ni is). When the Ni is 0, the data transfer mode is the slowest rate mode 0 among the Ultra DMA transfer modes (see Table 1). Therefore, it is judged that the data transfer mode cannot be set to a transfer mode slower than this, and step ST24 returns to step ST22.

When the Ni is greater than 0 (Ni>0), step ST24 advances to step ST25. In step ST25, the Ultra DMA transfer mode Ni of the host 200 is set to a transfer mode slower by one level (i.e., Ni=Ni−1) and a write operation is performed in the slower transfer mode.

Next, in step ST26 the occurrence of a CRC error during data transfer is monitored in the transfer mode slower by one level. In step ST27 it is judged whether or not a CRC error has occurred during the data transfer which is performed in the retried write operation.

If no CRC error occurs in the retried data transfer, then step ST27 advances to step ST30 and steps thereafter, in which a process of returning a data transfer rate to the initial data transfer rate is performed. When a CRC error has occurred in the retried data transfer, the current Ultra DMA transfer mode N is confirmed in step ST28. When the N is 0, it is judged that the current transfer mode N cannot be set to a transfer mode slower than this, because the current transfer mode is the slowest transfer mode 0 among the Ultra DMA transfer modes, and step ST28 returns to step ST27. When the N is greater than 0 (N>0), step ST28 advances to step ST29. In step ST29, the Ultra DMA transfer mode of the host 200 is set to a transfer mode still slower by one level (i.e., N=N−1) and a write operation is performed in the slower transfer mode. Thereafter, step ST29 returns to step ST27.

By the processing in the aforementioned steps ST22 through ST29, in the Ultra DMA transfer modes, if a CRC error occurs during the data transfer of a Write DMA Command, then a data transfer mode will be set to a transfer mode which is slower by one level and in which there is less occurrence of an error, and data transfer will be retried by reissue of a command. When a CRC error occurs even in a transfer mode slower by one level, data transfer is retried in a transfer mode further slower by one level. This minimizes the occurrence of a CRC error during data transfer, thereby performing reliable data transfer.

In the second embodiment of the present invention, a data transfer mode has been slowed by one level at a time on the occurrence of a CRC error so that the number of CRC errors is reduced without lowering the data transfer rate, if possible. However, depending upon the status of the CRC error occurrence, a data transfer mode may also be set immediately to the slowest mode 0 among the Ultra DMA transfer modes.

Returning to the flow in FIG. 3, when no CRC error has occurred in the data transfer at a certain data transfer rate in the aforementioned step ST27, in step ST30 a write operation is performed at that Ultra DMA transfer mode N. At the same time, the data transfer is judged to be in a state where there is no occurrence of a CRC error, and in step ST31 a process of returning data transfer rate to the initial data transfer rate is performed. The timing at which data transfer rate is returned to the initial data transfer rate is determined, for example, by (1) after a certain time has elapsed, (2) after a certain number of commands have been executed, (3) after a certain quantity of data have been transferred, or (4) combination of them, since a normal mode has been switched to a CRC error monitor mode. In the data transfer state of step ST30 where there is no occurrence of a CRC error, when there is a POR or hard reset signal, the data transfer mode is returned to the Default DMA transfer mode Nd of step ST33 which is default.

In step ST32 the occurrence of a CRC error during data transfer is monitored in the transfer mode returned to the initial data transfer rate, and step ST32 returns to the aforementioned step ST23.

On the other hand, when in the initial state immediately after power is turned on, when the Ultra DMA transfer mode is not allowed by the host, or when there is a POR or hard reset signal in each state, in step ST33 the data transfer mode is set to the Default DMA transfer mode Nd which is default.

As described above, the HDD and the host according to the second embodiment employ on the host side a method comprising the steps of: setting a first data transfer rate; transferring data between the storage unit (HDD) and the host at a first data transfer rate; detecting an error in the transferred data; setting the data transfer rate to a second data transfer rate slower than the first data transfer rate when a predetermined error is detected in the step of detecting an error; and transferring data between the storage unit and the host at the second transfer rate. Therefore, even during a write operation in which a Write DMA Command is sent from the host to the HDD, the status of the IDE I/F bus can be known by monitoring the status of the existing CRC error. Consequently, even higher reliable data transfer can be achieved without requiring any hardware change, and a reduction in the throughput of data transfer during a read/write operation can be suppressed to the minimum. In addition, since a mode can be automatically returned to the initial mode, the status of the IDE I/F bus can be dynamically reflected, whereby data can be transferred at the maximum data transfer rate in that status.

Third Embodiment

The entire structure of a disk drive according to a third embodiment of the present invention is similar to FIG. 1 and therefore a description of the hardware structure is omitted. However, in the third embodiment, the MPU 106 and CPU 201 in FIG. 1 are constructed so as to execute the data transfer rate control of FIG. 5 to be described later.

A conventional DMA controller has a function of performing data transfer and, at the same time, checking data content by a parity. In the case where correct data was not sent, the information is sent to the data sending side, and the data sending side resends data in response to the information. In this case, if a predetermined number of retries are unsuccessful, then an error message will be sent to the sending side.

As described above, the background art merely performs retries if a CRC error occurs. Therefore, in the case where a source of noise generation is present in a system or around a transfer path, the CRC error will frequently occur and a retry will be repeated each time, and consequently, there is the problem that the entire processing rate of the DMA transfer becomes slow.

Hence, the present invention provides a means for performing data transfer without errors.

In the ATA interface of an HDD, if an error occurs during data transfer in Ultra DMA transfer mode, the data will be decided as an error after data transfer by CRC error checking. At this time, in the background art, the host performs a retry and transfers the same command.

Figure 4:
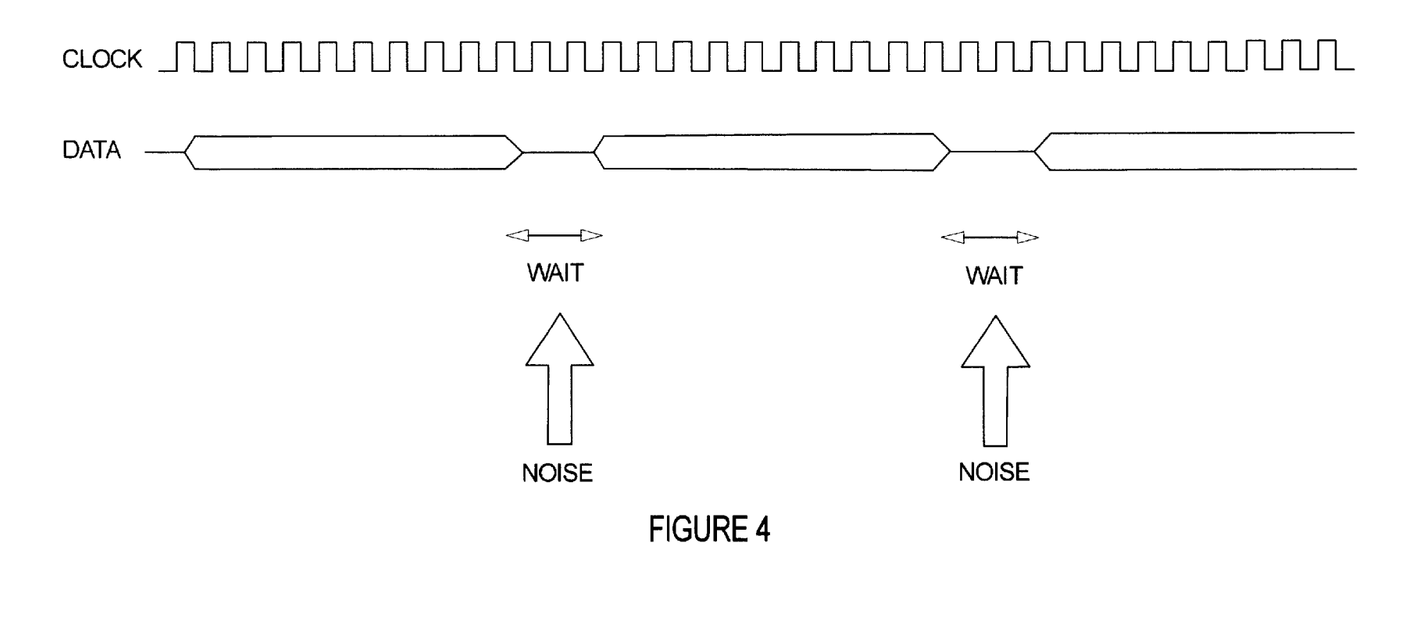
FIG. 4 is a timing chart for explaining the operation of a disk drive according to a third embodiment to which the present invention is applied.

In the present invention, as shown in FIG. 4, when checking a CRC error, a wait is inserted between data to vary a relative transfer rate, thereby escaping from major factors causing noise or an error. That is, in the circumstance where there is much noise, a retry is not merely repeated but if an error is detected, the timing at which data is transferred as the next retry will be varied and data will be transferred at the varied timing. Particularly, for burst noise resulting from a cyclic noise generation source (such as a motor and an oscillator), data transfer is attempted to be performed where the noise was avoided.

Now, the operation of the HDD will be described based on the aforementioned basic concepts.

If the HDD or the system generates a CRC error, a wait will be put between data when data transfer is performed from the system or the HDD. This wait is inserted according to the status of the CRC error occurrence, and for example, the wait spacing is increased at the unit of a clock for each retry. Also, this error condition and the wait spacing with which a CRC error was recovered are stored, and if a CRC error is generated next, then data transfer will be performed at the same wait spacing, based on the stored information. In addition, in the case where a CRC error is successively generated, waits are inserted until the next POR signal.

In the case of a read operation, the aforementioned wait insertion is controlled by the HDD, and in the case of a write operation, the wait insertion is controlled by the controller within the system.

Figure 5:
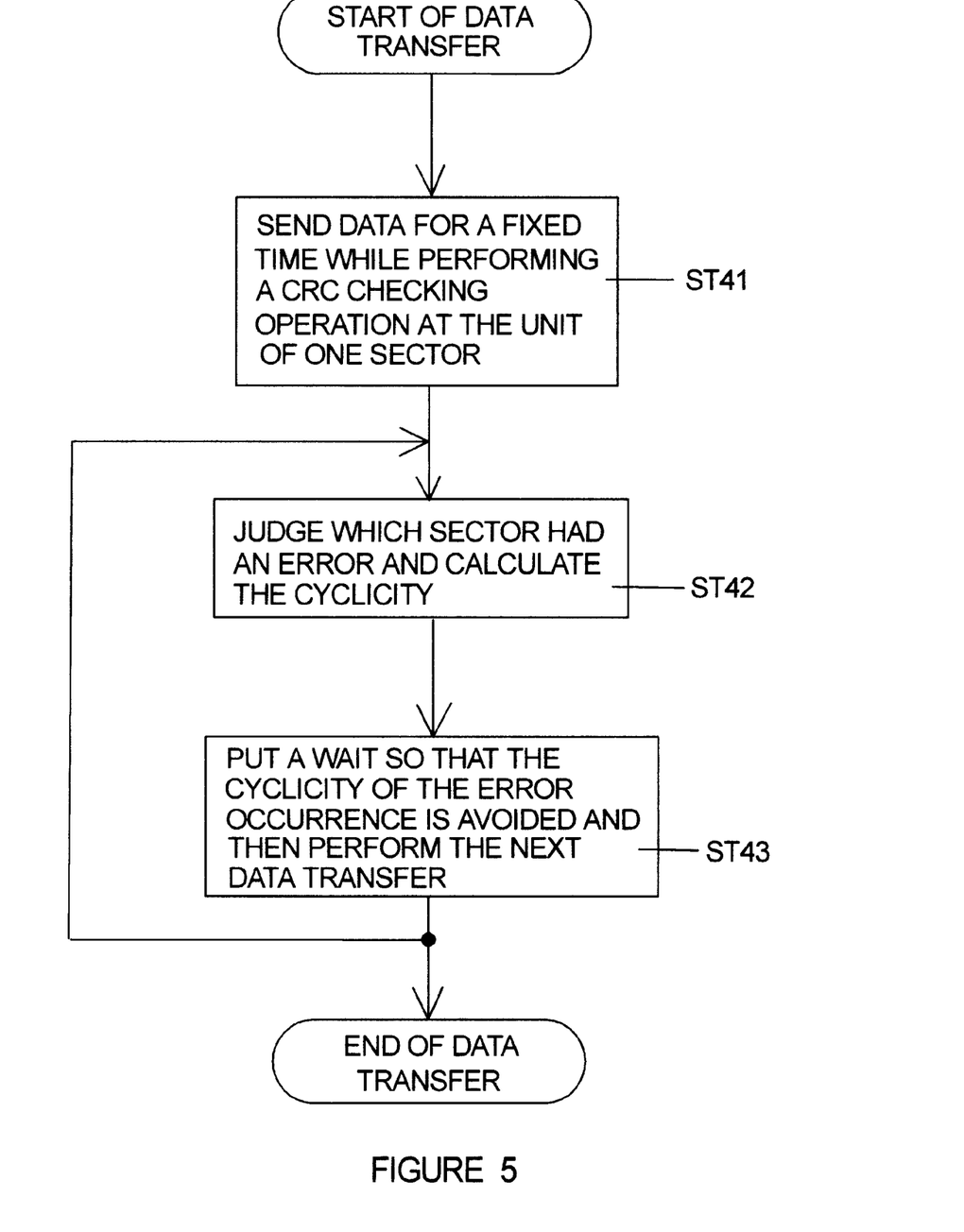
FIG. 5 is a flowchart showing the data transfer control that is executed at the aforementioned HDD side and system side.

FIG. 5 is a flowchart showing the data transfer control that is executed at the HDD side and the system side. The data transfer control is executed by the HDD during a read operation and by the system during a write operation, respectively. More specifically, this program is executed at a predetermined timing by the MPU 106 of the HDD 100 and the CPU 201 of the PC 200 of FIG. 1.

If data transfer is started, in step ST41 data will be sent for a fixed time (for example, 1 sec), while performing a CRC checking operation for each unit of one sector.

Next, in step ST42, which sector had an error is judged and the cyclicity of the error occurrence is calculated. For example, it is calculated that an error tends to occur once in 10 sectors.

Next, in step ST43 a wait bit is put between data bits in such a manner that the cyclicity of the error occurrence is avoided, and then the next data transfer is performed. Step ST43 returns to step ST42 and the aforementioned processing is repeated until end of data transfer. For example, as shown in FIG. 4, in the case where an error takes place once in 10 sectors due to cyclic burst noise, data is sent in such a manner that each time 10 sectors are sent, one sector is not sent.

The aforementioned steps ST42 and ST43 are repeatedly executed until the end of data transfer, and even if new cyclic burst noise were generated, waits would be input so as to avoid that noise generation. Therefore, major factors causing CRC errors can be avoided as much as possible, and consequently, the effect of a reduction in the number of retries is great.

It is possible that a system, an HDD, and the data transfer path therebetween will be used under the circumstance where they are subjected to the influence of a cyclic noise source (for example, motors and oscillators), and in such a case, even if there were a delay due to insertion of wait bits, the effect of a reduction in the number of retries by reducing the occurrence of errors would be great.

As previously described, in the HDD 100 according to the third embodiment, the MPU 106 of the HDD 100 and the CPU 201 of the PC 200 are equipped with error detection means for detecting an error in transferred data, calculation means for calculating cyclicity of the detected error occurrence, and control means for performing control so that data transfer is performed in such a manner that a predetermined wait bit is inserted between data bits to avoid the calculated cyclicity of the detected error occurrence, based on the output of the calculation means. Therefore, for burst noise resulting from a cyclic noise generation source (e.g., motors, oscillators, etc.), data transfer can be performed where that noise was avoided, and consequently, data transfer can be performed without errors.

In this embodiment, the data transfer rate is not slowed on the whole as in the first and second embodiments, but wait bits are inserted so that only points where errors occur are avoided. Therefore, a reduction in the data transfer rate can be minimized although it depends upon the status of the noise occurrence. Particularly, since points where errors occur can be avoided, the total transfer time and data reliability can be even further enhanced. In addition, if this embodiment is employed together with the aforementioned first and second embodiments, synergetic effects can be expected.

In the aforementioned embodiments, while the present invention has been applied to an HDD, it is not limited to this but is also applicable to any other unit if it is equipped with a data transfer function. For example, the present invention may also be employed in an external recording other than HDDs, such as a magneto-optical disk data storage, and similar advantages as the aforementioned embodiments can be obtained.

In addition, although the first and second embodiments have been applied to the DMA transfer based on the Ultra DMA transfer mode (for example, ATA/ATAPI-4T13/1153D Revision 9, etc.), the present invention is not limited to the DMA transfer but is also applicable to any other transfer method if it is capable of transferring data at a plurality of data transfer rates different in data transfer rate.

Furthermore, it is a matter of course that the HDC, MPU, and interface constituting the aforementioned disk drive are not limited in kind and number to the embodiments described above.

We claim:

1. A data transfer unit for transferring data using direct memory access (DMA) between a storage unit and a host, comprising:

data transfer means for transferring data using DMA at one of at least first and second data transfer rates where the second data transfer rate is slower than the first data transfer rate;

error detection means for detecting a predetermined type of error in transferring the data;

control means for transferring data between the storage unit and the host at the first data transfer rate until an error of the predetermined type of error is detected by the error detection means whereupon the data is temporarily transferred at the second data transfer rate until a specified event occurs;

calculation means for calculating cyclicity of a plurality of error occurrences of the predetermined error type at the second data transfer rate; and control means for inserting a predetermined wait to avoid transferring data at the cyclicity of the plurality of error occurrences of the predetermined error type.

2. The data transfer unit of claim 1, further comprising means for returning a data transfer rate to the first data transfer rate when the specified event occurs and wherein the specified event includes that a predetermined time has elapsed while transferring data at the second rate.

3. The data transfer unit of claim 1, further comprising means for returning a data transfer rate to the first data transfer rate when the specified event occurs and wherein the specified event includes that a predetermined number of commands have been received while transferring data at the second rate.

4. The data transfer unit of claim 1, further comprising means for returning a data transfer rate to the first data transfer rate when the specified event occurs and wherein the specified event includes that a predetermined amount of data has been transferred while transferring data at the second rate.

5. The data transfer unit as set forth in claim 1, wherein the DMA is an Ultra DMA.

6. The data transfer unit as set forth in claim 1 wherein the predetermined error type is a CRC error.

* * * * *